US008560001B2

United States Patent
Kawai et al.

(10) Patent No.: US 8,560,001 B2
(45) Date of Patent: Oct. 15, 2013

(54) BASE STATION APPARATUS, USER EQUIPMENT TERMINAL, AND COMMUNICATION CONTROL METHOD

(75) Inventors: Hiroyuki Kawai, Yokosuka (JP); Akihito Morimoto, Yokohama (JP); Hidekazu Taoka, Tokyo (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 374 days.

(21) Appl. No.: 12/990,650

(22) PCT Filed: Apr. 23, 2009

(86) PCT No.: PCT/JP2009/058070
§ 371 (c)(1),
(2), (4) Date: Jan. 6, 2011

(87) PCT Pub. No.: WO2009/133805
PCT Pub. Date: Nov. 5, 2009

(65) Prior Publication Data
US 2011/0092241 A1    Apr. 21, 2011

(30) Foreign Application Priority Data
May 2, 2008 (JP) ................................ 2008-120661

(51) Int. Cl.
*H04B 7/00*    (2006.01)
(52) U.S. Cl.
USPC ............ 455/522; 455/69; 455/70; 455/509; 455/516; 455/561; 370/315; 370/316; 370/317; 370/318; 370/319

(58) Field of Classification Search
USPC .......... 455/522, 69–70, 509–516, 561, 562.1; 370/315–320
See application file for complete search history.

(56) References Cited

U.S. PATENT DOCUMENTS

| | | | |
|---|---|---|---|
| 2006/0079288 A1* | 4/2006 | Lindoff ...................... 455/562.1 |
| 2008/0008110 A1* | 1/2008 | Kishigami et al. ............ 370/310 |
| 2010/0046445 A1* | 2/2010 | Sawahashi et al. ........... 370/329 |
| 2011/0059700 A1* | 3/2011 | Kim et al. ....................... 455/69 |

FOREIGN PATENT DOCUMENTS

| | | |
|---|---|---|
| WO | 2005/114874 A1 | 12/2005 |
| WO | 2007052602 A1 | 5/2007 |
| WO | 2008013173 A1 | 1/2008 |
| WO | 2008/023646 A1 | 2/2008 |

OTHER PUBLICATIONS

International Search Report w/translation from PCT/JP2009/058070 dated Jul. 7, 2009 (4 pages).

(Continued)

*Primary Examiner* — Fayyaz Alam
(74) *Attorney, Agent, or Firm* — Osha Liang LLP

(57) ABSTRACT

A base station apparatus includes a transmit diversity setting unit configured to set a transmit diversity mode to be applied to a user equipment terminal; a reception quality calculating unit configured to determine reception quality corresponding to the transmit diversity mode based on the transmit diversity mode set by the transmit diversity setting unit; a scheduling unit configured to determine a user equipment terminal to which a radio resource is to be allocated based on the reception quality determined by the reception quality calculating unit; and a notifying unit configured to notify the user equipment terminal to which the radio resource is allocated as determined by the scheduling unit of the transmit diversity mode to be applied.

14 Claims, 11 Drawing Sheets

(56) References Cited

OTHER PUBLICATIONS

Written Opinion from PCT/JP2009/058070 dated Jul. 7, 2009 (4 pages).

3GPP TSG RAN WG1 Meeting #47bis, R1-070097; "Performance Evaluation of Closed Loop-Based Antenna Switching Transmit Diversity in E-UTRA Uplink"; NTT DOCOMO, Inc.; Sorrento, Italy; Jan. 15-19, 2007 (7 pages).

3GPP TS 36.211 V8.2.0; "3rd Generation Partnership Project; Technical Specification Group Radio Access Network; Evolved Universal Terrestrial Radio Access (E-UTRA); Physical Channels and Modulation (Release8)"; Mar. 2008 (65 pages).

Japanese Office Action for Application No. 2008-120661, mailed on May 8, 2012 (8 pages).

English abstract for WO 2008-013173, publication date Jan. 31, 2008, esp@cenet database, (1 page).

English abstract for WO 2007-052602, publication date May 10, 2007, esp@cenet database, (1 page).

NTT DOCOMO, Institute for Infocomm Research, Mitsubishi Electric, NEC, Sharp, Toshiba Corporation, "Closed Loop Antenna Switching in E-UTRA Uplink", 3GPP TSG WG1 Meeting #48, R1-070860, St. Louis, USA, Feb. 12-16, 2007.

* cited by examiner

BASE STATION APPARATUS, USER EQUIPMENT TERMINAL, AND COMMUNICATION CONTROL METHOD

TECHNICAL FIELD

The present invention relates to a radio communication system and specifically relates to a base station apparatus, a user equipment terminal, and a communication control method.

BACKGROUND ART

As a next-generation communication system of the W-CDMA (Wideband Code Division Multiple Access) system and the HSDPA (High Speed Downlink Packet Access) system, an E-UTRA (Evolved UTRA and UTRAN) system (also referred to as an LTE (Long Term Evolution) system or a Super 3G system) has been studied by 3GPP ($3^{rd}$ Generation Partnership Project) which is a standards body of the W-CDMA. In the E-UTRA system, an OFDMA (Orthogonal Frequency Division Multiple Access) scheme and an SC-FDMA (Single-Carrier Frequency Division Multiple Access) scheme are applied to downlink communications and uplink communications, respectively.

The OFDMA scheme is a transmission scheme in which a frequency band is divided into plural subcarriers having narrower frequency bands and data are transmitted on the respective subcarriers. In the OFDMA scheme, the subcarriers are closely arranged in the frequency direction, allowing the subcarriers to be partly overlapped without causing interference, so that fast data transmission can be achieved and frequency usage efficiency can be improved.

The SC-FDMA scheme is a transmission scheme in which a frequency band is divided so that different frequencies can be separately used among plural terminals (user equipment terminals) and as a result, interference between terminals can be reduced. Further, in the SC-FDMA scheme, a range of transmission power fluctuation can be made smaller, and thus lower energy consumption of terminals can be achieved and a wider coverage area can be obtained.

The SC-FDMA scheme used for uplink radio access in the E-UTRA system is described below. A frequency band available for the system is divided into plural resource blocks. Each resource block includes one or more subcarriers. One or more resource blocks are allocated to a user equipment (UE) terminal. According to frequency scheduling, a base station apparatus preferentially allocates resource blocks to user equipment terminals having better channel conditions based on received signal quality or channel condition information (CQI: channel quality indicator), which is measured by the base station apparatus, for each uplink resource block for each user equipment terminal. As a result, transmission efficiency or throughput in the whole system can be improved. In addition, frequency hopping may be used to change available frequency blocks according to a predetermined frequency hopping pattern.

In the SC-FDMA scheme, respective user equipment terminals in a cell transmit signals using different time and frequency resources. Thus, orthogonality among user equipment terminals in the cell can be achieved. In the SC-FDMA scheme, a continuous frequency is allocated to the user equipment terminal, thereby allowing for single-carrier transmissions with low PAPR (peak-to-average power ratio). Accordingly, a wider coverage area can be obtained in uplink with severe restrictions on transmission power. In the SC-FDMA scheme, time and frequency resources to be allocated are determined by the scheduler in the base station apparatus based on a propagation condition and/or QoS (Quality of Service) of data to be transmitted for each user. As used herein, the QoS includes a data rate, a required error rate, and a delay. Allocating time and frequency resources to respective user equipment terminals with better propagation conditions in this manner can improve throughput.

[Non-patent document 1] 3GPP TS 36.211: "Evolved Universal Terrestrial Radio Access (E-UTRA); Physical Channels and Modulation".

DISCLOSURE OF INVENTION

Problem(s) to be Solved by the Invention

Discussions on a next-generation radio communication system of the Evolved UTRA and UTRAN system have been launched. The next-generation communication system may be called an IMT-Advanced (International Mobile Telecommunication-Advanced) system or a 4G (fourth generation) system.

The next-generation radio communication system should support communications under various environments. For example, these various environments mainly include a micro cell, an indoor cell, and a hot-spot cell.

In addition, it is required in the next-generation radio communication system that services be provided according to various environments, required QoS, and so on. As used herein, the services include a high-speed data rate, and support for various types of traffic required by QoS requirements. In addition, a wider coverage area is required. For example, these various environments include a macro cell, a micro cell, an indoor cell, and a hot-spot cell. In the next-generation radio communication system, communications under these various environments should be supported. As described above, the QoS includes a data rate, a required error rate, and a delay. The data rate may be called user throughput.

In addition, it is desirable that the next-generation communication system be compatible with the 3G (third generation) system. For example, it is desirable to achieve full support of the E-UTRA system and handover for the existing 3G system such as the W-CDMA system or the E-UTRA system.

Among these requirements, from the viewpoint of increasing user throughput compared to the E-UTRA system, a multi-carrier scheme is more preferable in uplink communications than a single-carrier scheme as used in the E-UTRA system. This is because the OFDM-based multi-carrier scheme is superior due to higher tolerance to multi-path interference, when single-user MIMO (Multiple Input Multiple Output) is applied for the purpose of high-speed transmissions. On the other hand, from the viewpoint of obtaining a wider coverage area, the single-carrier scheme is preferable, because the PAPR can be reduced. The single-carrier scheme is also preferable from the viewpoint of achieving full support of the E-UTRA system.

In the next-generation radio communication system, it has been discussed that a user equipment terminal includes plural RF circuits. Aside from this, it has been also discussed that transmit diversity is applied to a user equipment terminal. However, transmit diversity in a user equipment terminal including plural RF circuits has not been discussed.

It is a general object of the present invention to provide a base station apparatus, a user equipment terminal, and a communication control method, in which transmit diversity can be applied according to an environment.

Means for Solving the Problem(s)

In one aspect of the present invention, there is provided a base station apparatus, including:

a transmit diversity setting unit configured to set a transmit diversity mode to be applied to a user equipment terminal;

a reception quality calculating unit configured to determine reception quality corresponding to the transmit diversity mode based on the transmit diversity mode set by the transmit diversity setting unit;

a scheduling unit configured to determine a user equipment terminal to which a radio resource is to be allocated based on the reception quality determined by the reception quality calculating unit; and a notifying unit configured to notify the user equipment terminal to which the radio resource is allocated as determined by the scheduling unit of the transmit diversity mode to be applied.

In another aspect of the present invention, there is provided a user equipment terminal including plural antennas and plural RF circuits, to which plural transmit diversity modes are applied, including:

a transmission control unit configured to control transmission according to a transmit diversity mode reported from a base station apparatus among the plural transmit diversity modes; and a transmitting unit configured to transmit an uplink signal according to control by the transmission control unit using the plural RF circuits.

In another aspect of the present invention, there is provided a communication control method, including the steps of:

setting, by a base station apparatus, a transmit diversity mode to be applied to a user equipment terminal;

determining, by the base station apparatus, reception quality corresponding to the transmit diversity mode based on the transmit diversity mode set in the setting step;

determining, by the base station apparatus, a user equipment terminal to which a radio resource is to be allocated based on the reception quality determined in the reception quality determining step; and notifying, by the base station apparatus, the user equipment terminal to which the radio resource is allocated as determined in the user equipment terminal determining step of the transmit diversity mode to be applied.

Advantageous Effect of the Invention

According to an embodiment of the present invention, a base station apparatus, a user equipment terminal, and a communication control method can be achieved, in which transmit diversity can be applied according to an environment.

DETAILED DESCRIPTION OF THE PREFERRED EMBODIMENTS

Figure 1:
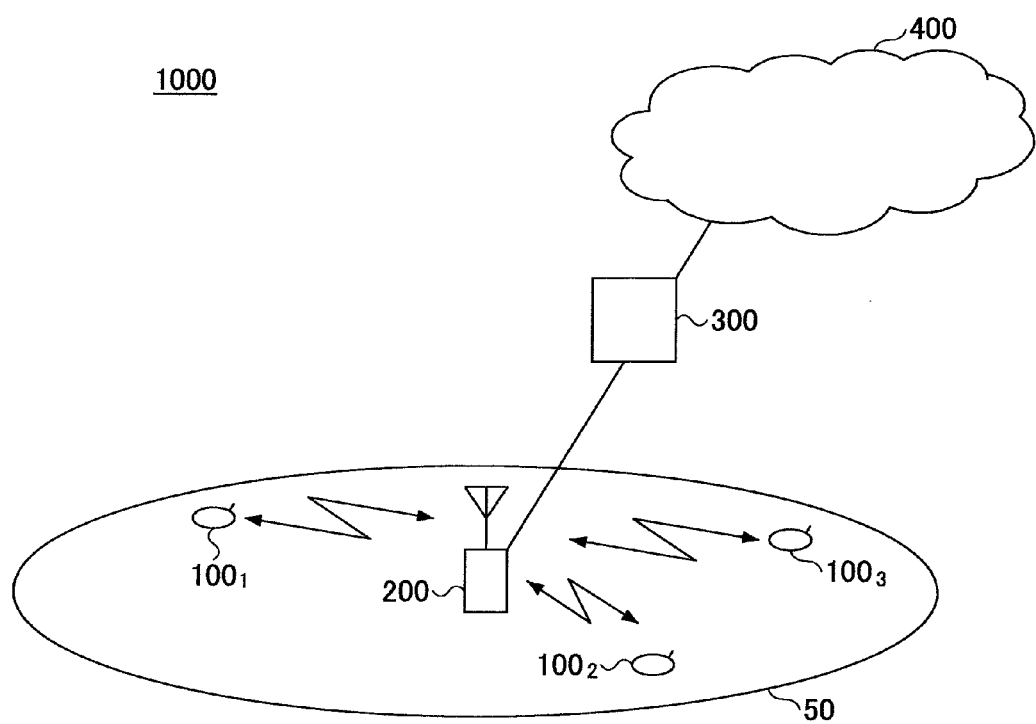
FIG. 1 shows a radio communication system according to an embodiment of the present invention.

Embodiments of the present invention are described below with reference to the accompanying drawings. Throughout the figures for illustrating the embodiments of the present invention, the same reference numerals are used for the same or equivalent elements and their repeated descriptions may be omitted.

[First Embodiment]

First, a radio communication system including user equipment terminals and a base station apparatus according to a first embodiment of the present invention is described with reference to FIG. 1.

The radio communication system 1000 includes or accommodates an Evolved UTRA and UTRAN system (also referred to as an LTE (Long Term Evolution) system or a Super 3G system), for example.

The radio communication system 1000 may be an IMT-Advanced system or a 4G (fourth generation) system.

The radio communication system 1000 includes a base station apparatus (eNB: eNodeB) 200 and plural user equipment terminals (UE: user equipment) $100_n$ ($100_1$, $100_2$, $100_3$, ... $100_n$; n: an integer greater than zero) capable of communicating with the base station apparatus 200. The eNB and UE may be termed differently according to discussions in a next-generation radio communication system. In such circumstances, the eNB and UE may be referred to by different terms. The base station apparatus 200 is connected to an upper node. The upper node is connected to a core network 400. For example, the upper node may include an access gateway apparatus 300. The upper node may be a different node according to discussions in the next-generation radio communication system. In such circumstances, the base station apparatus 200 is connected to the different node.

Each of the user equipment terminals $100_n$ ($100_1$, $100_2$, $100_3$, ... $100_n$) has the same configuration, functions, and status. Therefore, unless otherwise described, the term user equipment terminals $100_n$ may be collectively used in the following descriptions.

As the radio access scheme in the radio communication system 1000, for example, in the Evolved UTRA system, the OFDMA (Orthogonal Frequency Division Multiple Access) scheme and the SC-FDMA (Single-Carrier Frequency Division Multiple Access) scheme are used in downlink and uplink communications, respectively. As described above, the OFDMA scheme is a multi-carrier transmission scheme in which a frequency band is divided into plural sub-carriers having narrow frequency bands and data are mapped into the respective sub-carriers for communications. The SC-FDMA scheme is a single-carrier transmission scheme in which different frequency bands are separately used among plural user equipment terminals and as a result, interference between terminals can be reduced. Using these access schemes, the radio communication system 1000 achieves full support of the E-UTRA system.

Next, communication channels used in the Evolved UTRA and UTRAN system are described below. These communication channels may be used in the radio communication system 1000 according to this embodiment of the present invention.

In downlink communications, a Physical Downlink Shared Channel (PDSCH) that is shared among the user equipment terminals $100_n$ and a Physical Downlink Control Channel (PDCCH) are used. The Physical Downlink Control Channel is also referred to as an L1/L2 control channel. User data (normal data signals) are transmitted via the Physical Downlink Shared Channel.

In uplink communications, a Physical Uplink Shared Channel (PUSCH) that is shared among the user equipment terminals $100_n$ and a Physical Uplink Control Channel (PUCCH) are used. User data (normal data signals) are transmitted via the PUSCH. In uplink, a downlink Channel Quality Indicator (CQI) to be used for scheduling and Adaptive Modulation and Coding (AMC) for the Physical Downlink Shared Channel, and acknowledgement information of the Physical Downlink Shared Channel are transmitted via the Physical Uplink Control Channel. The acknowledgement information may be represented as either ACK (Acknowledgement) indicating that a transmission signal is successfully received or NACK (Negative Acknowledgement) indicating that the transmission signal is not successfully received.

In addition to the CQI and the acknowledgement information, a scheduling request requesting resource allocation of the uplink shared channel and a release request for persistent scheduling may be transmitted via the Physical Uplink Control Channel. As used herein, the resource allocation of the uplink shared channel means that the base station apparatus 200 uses the Physical Downlink Control Channel in a subframe to notify the user equipment terminal $100_n$ that the user equipment terminal $100_n$ may communicate using the uplink shared channel in the subsequent subframe.

In the radio communication system 1000 according to this embodiment, the user equipment terminal $100_n$ includes plural antennas. In addition, the user equipment terminal $100_n$ includes plural RF circuits. The number of antennas and the number of RF circuits may be the same or different among user equipment terminals $100_n$.

The user equipment terminal $100_n$ according to this embodiment transmits uplink data according to a transmit diversity mode selected from plural open-loop transmit diversity modes. The open-loop transmit diversity modes may include at least two of a transmit diversity mode using space-time block coding (STBC), a transmit diversity mode using space-frequency block coding (SFBC), a cyclic delay diversity (CDD) mode, a frequency switched transmit diversity (FSTD) mode, a time switched transmit diversity (TSTD) mode, and a transmit diversity mode in which precoding vector switching (PVS) is applied. STBC may be quasi-orthogonal STBC and SFBC may be quasi-orthogonal SFBC.

According to STBC, the user equipment terminal $100_n$ performs space-time block coding of plural transmission sequences to increase the diversity gain. According to SFBC, the user equipment terminal $100_n$ performs space-frequency block coding to increase the diversity gain. According to CDD, the user equipment terminal $100_n$ performs differential transmission among plural antennas. According to OFDM, since a cyclic prefix (CP) is inserted between symbols, delayed transmission is available within the range of the CP.

According to FSTD, the user equipment terminal $100_n$ switches transmission antennas for each frequency. By switching transmission antennas for each frequency, the base station apparatus 200 can achieve a diversity effect. According to TSTD, the user equipment terminal $100_n$ periodically switches transmission antennas for each radio slot. The user equipment terminal $100_n$ transmits a signal from one of the transmission antennas at one time. The base station apparatus 200 alternately receives signals transmitted through different propagation paths from plural antennas, thereby achieving a diversity effect. According to PVS, the user equipment terminal $100_n$ switches weights for transmission antennas.

The user equipment terminal $100_n$ according to this embodiment may also transmit uplink signals according to a transmit diversity mode selected from the open-loop transmit diversity mode and a closed-loop transmit diversity mode.

The closed-loop transmit diversity mode includes a phase diversity (TxAA: Transmit Adaptive Antennas) mode. According to the phase diversity mode, the user equipment terminal $100_n$ adjusts phases of transmission signals so that the base station apparatus 200 can receive the transmission signals with the same phase (in-phase).

The base station apparatus 200 according to this embodiment selects, from antennas in the user equipment terminal $100_n$, one or more antennas to transmit uplink signals. It is preferable that the base station apparatus 200 select two or more antennas from the viewpoint of applying transmit diversity. For example, the base station apparatus 200 may select the same number of antennas as the number of RF circuits in the user equipment terminal $100_n$. The base station apparatus 200 according to this embodiment also selects a transmit diversity mode to be applied to the user equipment terminal $100_n$.

In addition, the base station apparatus 200 according to this embodiment transmits, as a downlink signal, information about the selected antennas (hereinafter referred to as antenna selection information) and information about the transmit diversity mode to be applied to the user equipment terminal $100_n$ (hereinafter referred to as transmit diversity information). For example, the base station apparatus 200 may transmit the antenna selection information and the transmit diversity information as control information. More specifically, the base station apparatus 200 may transmit the antenna selection information and the transmit diversity information using a scheduling grant. For example, the base station apparatus 200 may transmit the antenna selection information and the transmit diversity information for each transmission time interval (TTI) assignment. For example, the base station apparatus 200 may transmit the antenna selection information and the transmit diversity information using upper-layer signaling. In this case, the antenna selection information and the transmit diversity information may be transmitted at longer time intervals. The base station apparatus 200 may transmit the antenna selection information and the transmit diversity information at the same timing. Alternatively, the base station apparatus 200 may transmit the antenna selection information and the transmit diversity information at different timings. When the antenna selection information and the transmit diversity information are transmitted at different timings, the base station apparatus 200 may transmit them independently or at different time intervals.

As described below, the base station apparatus 200 according to this embodiment can determine a transmit diversity mode to be applied to the user equipment terminal 100$_n$ according to the combination of the number of antennas and the number of RF circuits.

Next, the user equipment terminal 100$_n$ according to this embodiment is described below with reference to FIGS. 2 and 3.

In this embodiment, the user equipment terminal 100$_n$ includes two antennas and two RF circuits, for example. FIG. 2 shows a transmission apparatus to which open-loop transmit diversity is applied. In this embodiment, the open-loop transmit diversity mode includes an STBC or SFBC mode, for example. Alternatively, an open-loop transmit diversity mode other than the STBC or SFBC mode may be applied. When the open-loop transmit diversity mode other than the STBC or SFBC mode is applied, its related processes are performed in the transmission apparatus.

The user equipment terminal 100$_n$ according to this embodiment includes a transmission apparatus. The transmission apparatus includes a data modulation unit 102, an encoding unit 104, inverse fast Fourier transform (IFFT) units 106$_1$ and 106$_2$, CP adding units 108$_1$ and 108$_2$, RF circuits 110$_1$ and 110$_2$, power amplifiers 112$_1$ and 112$_2$, and antennas 114$_1$ and 114$_2$.

The antenna selection information and the transmit diversity information transmitted from the base station apparatus 200 are supplied to the encoding unit 104.

Transmission data are supplied to the data modulation unit 102. The data modulation unit 102 modulates the transmission data. The data modulation unit 102 supplies the modulated transmission data to the encoding unit 104.

The encoding unit 104, which is connected to the data modulation unit 102, encodes the modulated transmission data, if needed, based on the supplied transmit diversity information. For example, when uplink signals are transmitted according to the single-carrier scheme, the encoding unit 104 performs discrete Fourier transform (DFT) of the modulated symbol sequence, allocates radio resources to the DFT signals, and generates signals in the frequency domain. Then, the encoding unit 104 encodes the signals based on the supplied transmit diversity information. The encoding unit 104 supplies the encoded signals in the frequency domain to the IFFT units 106$_1$ and 106$_2$.

For example, when uplink signals are transmitted according to the multi-carrier scheme, the encoding unit 104 may serial-parallel convert the modulated symbol sequence, allocate radio resources to the serial-parallel converted signals, and generate signals in the frequency domain. Then, the encoding unit 104 encodes the signals based on the supplied transmit diversity information. The encoding unit 104 supplies the encoded signals in the frequency domain to the IFFT units 106$_1$ and 106$_2$.

For example, when the supplied transmit diversity information indicates the STBC mode, the encoding unit 104 performs space-time block coding of the plural single-carrier signals or multi-carrier signals generated in the frequency domain. For example, when the supplied transmit diversity information indicates the SFBC mode, the encoding unit 104 performs space-frequency block coding of the plural single-carrier signals or multi-carrier signals generated in the frequency domain.

The IFFT units 106$_1$ and 106$_2$ are connected to the encoding unit 104. The IFFT units 106$_1$ and 106$_2$ perform inverse fast Fourier transform of the supplied signals to modulate them according to the OFDM scheme. The signals modulated by the IFFT units 106$_1$ and 106$_2$ according to the OFDM scheme are supplied to the CP adding units 108$_1$ and 108$_2$, respectively.

The CP adding units 108$_1$ and 108$_2$ are connected to the IFFT units 106$_1$ and 106$_2$, respectively. The CP adding units 108$_1$ and 108$_2$ add cyclic prefixes to the OFDM-modulated signals to generate OFDM symbols. The CP adding units 108$_1$ and 108$_2$ supply the generated OFDM symbols to the RF circuits 110$_1$ and 110$_2$, respectively.

The RF circuits 110$_1$ and 110$_2$ are connected to the CP adding units 108$_1$ and 108$_2$, respectively. The RF circuits 110$_1$ and 110$_2$ transform the OFDM symbols supplied from the CP adding units 108$_1$ and 108$_2$ into radio waves and supply them to the power amplifiers 112$_1$ and 112$_2$, respectively.

The power amplifiers 112$_1$ and 112$_2$ are connected to the RF circuits 110$_1$ and 110$_2$, respectively. The power amplifiers 112$_1$ and 112$_2$ amplify the radio waves supplied from the RF circuits 110$_1$ and 110$_2$ to transmit them from the antennas 114$_1$ and 114$_2$, respectively.

Next, a transmission apparatus to which closed-loop transmit diversity is applied is described below with reference to FIG. 3. In this embodiment, a phase diversity (TxAA) mode is applied as the closed-loop transmit diversity mode, for example. Alternatively, a closed-loop transmit diversity mode other than the TxAA mode may be applied. When the closed-loop transmit diversity mode other than the TxAA mode is applied, its related processes are performed in the transmission apparatus.

The user equipment terminal 100$_n$ according to this embodiment includes a transmission apparatus. The transmission apparatus includes a data modulation unit 102, an inverse fast Fourier transform (IFFT) unit 106, a CP adding unit 108, RF circuits 110$_1$ and 110$_2$, power amplifiers 112$_1$ and 112$_2$, antennas 114$_1$ and 114$_2$, and a phase shift unit 116.

The antenna selection information and the transmit diversity information transmitted from the base station apparatus 200 are received by the user equipment terminal 100$_n$. In this embodiment, the user equipment terminal 100$_n$ includes two antennas and two RF circuits, and thus it is known that the two antennas are used in the user equipment terminal 100$_n$. Since the number of antennas used in the user equipment terminal 100$_n$ is known, the base station apparatus 200 may notify the user equipment terminal 100$_n$ of only the transmit diversity information. The transmit diversity information may include phase control information. In addition, the transmit diversity information may include transmit weight information, for example. The transmit weight information may be quantized values.

For example, when the base station apparatus 200 determines that the TxAA mode is to be applied to the user equipment terminal 100$_n$, the following processes are performed. The base station apparatus 200 allows the user equipment terminal 100$_n$ to adjust phases of transmission signals so that the base station apparatus 200 can receive the transmission signals from the user equipment terminals 100$_n$ with the same phase (in-phase). For example, the base station apparatus 200 separates from the transmission signals sounding reference signals for respective antennas in the user equipment terminal 100$_n$, which are transmitted from the user equipment terminal 100$_n$. Then, the base station apparatus 200 determines phase control information based on the separated sounding reference signals for the respective antennas. For example, the phase control information includes the amount of phase rotation. The base station apparatus 200 may determine weights to be applied to the transmission antennas based on the separated sounding reference signals for the respective antennas. For example, the weights may be quantized values.

The base station apparatus 200 transmits the amount of phase rotation to the user equipment terminal $100_n$. For example, the base station apparatus 200 may include the amount of phase rotation in the transmit diversity information and transmit it to the user equipment terminal $100_n$. The base station apparatus 200 transmits the weight information to the user equipment terminal $100_n$. For example, the base station apparatus 200 may include the weight information in the transmit diversity information and transmit it to the user equipment terminal $100_n$.

Transmission data are supplied to the data modulation unit 102. The data modulation unit 102 modulates the transmission data. The modulated transmission data are supplied to the IFFT unit 106. For example, when uplink signals are transmitted according to the single-carrier scheme, the modulated symbol sequence undergoes the discrete Fourier transform, radio resources are allocated to the DFT signals, and signals are generated in the frequency domain. Then, the signals in the frequency domain are supplied to the IFFT unit 106. For example, when uplink signals are transmitted according to the multi-carrier scheme, the modulated symbol sequence may undergo serial-parallel conversion, radio resources may be allocated to the serial-parallel converted signals, and signals may be generated in the frequency domain. Then, the signals in the frequency domain are supplied to the IFFT unit 106.

The IFFT unit 106 is connected to the data modulation unit 102. The IFFT unit 106 performs inverse fast Fourier transform of the signals supplied from the data modulation unit 102 to modulate them according to the OFDM scheme. The signals modulated by the IFFT unit 106 according to the OFDM scheme are supplied to the CP adding unit 108.

The CP adding unit 108 is connected to the IFFT unit 106. The CP adding unit 108 adds cyclic prefixes to the OFDM-modulated signals to generate OFDM symbols. The CP adding unit 108 supplies the generated OFDM symbols to the RF circuit $110_1$ and the phase shift unit 116.

The phase shift unit 116 is connected to the CP adding unit 108. The phase shift unit 116 controls the phases of the OFDM symbols supplied from the CP adding unit 108. For example, the phase shift unit 116 rotates the phases of the OFDM symbols supplied from the CP adding unit 108. Then, the phase shift unit 116 supplies the phase-rotated symbols to the RF circuit $110_2$.

The RF circuits $110_1$ and $110_2$ transform the OFDM symbols supplied from the CP adding unit 108 and the phase shift unit 116 into radio waves and supply them to the power amplifiers $112_1$ and $112_2$, respectively. The power amplifiers $112_1$ and $112_2$ amplify the supplied radio waves to transmit them from the antennas $114_1$ and $114_2$, respectively.

Figure 2:
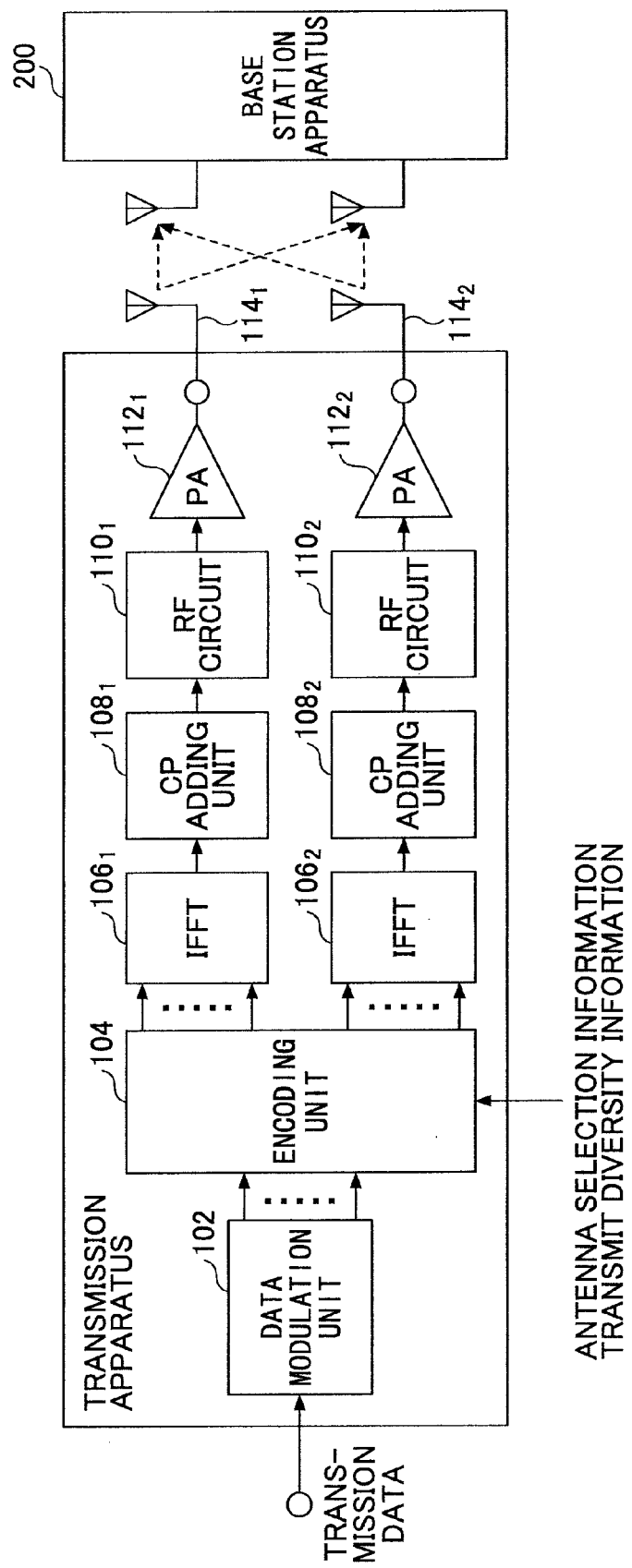
FIG. 2 shows a partial block diagram of a user equipment terminal according to an embodiment of the present invention.
Figure 3:
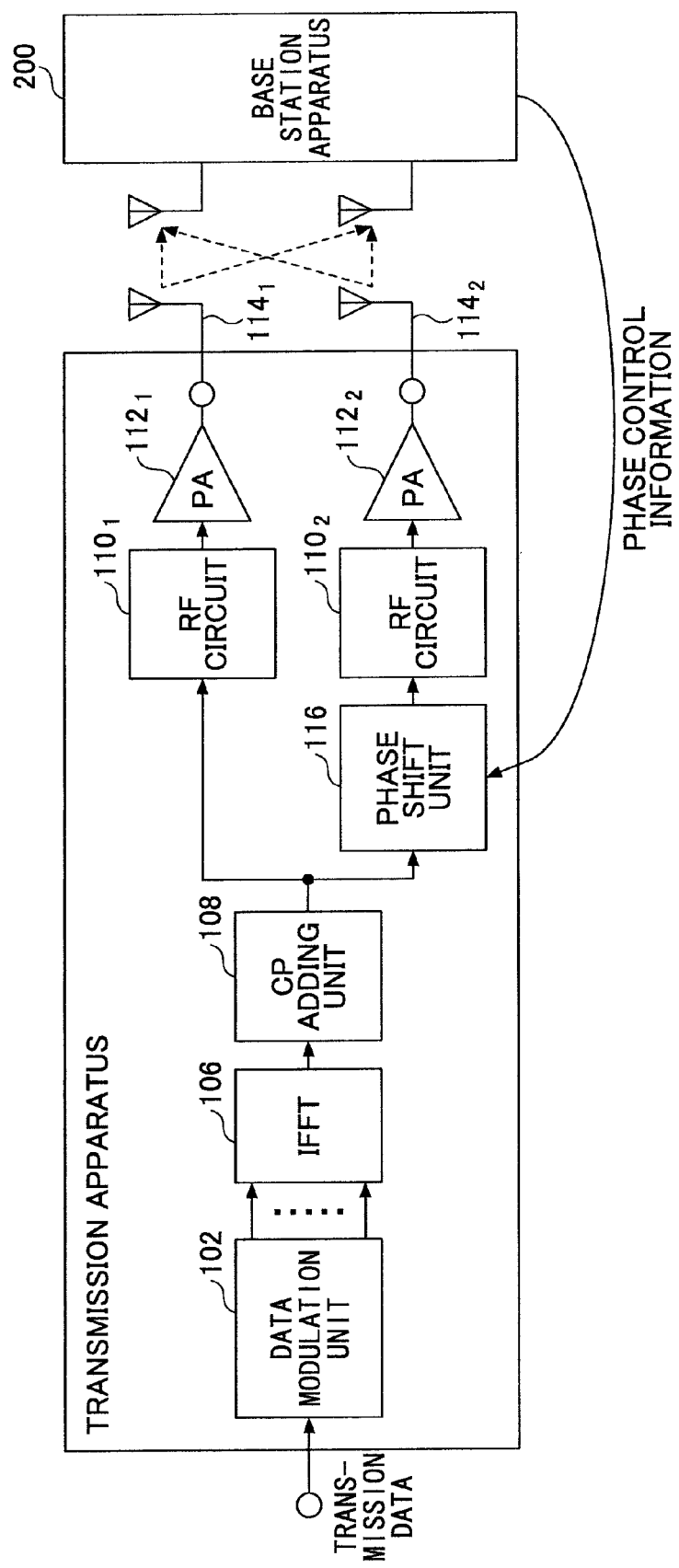
FIG. 3 shows a partial block diagram of a user equipment terminal according to an embodiment of the present invention.

When both open-loop transmit diversity and closed-loop transmit diversity can be applied to the user equipment terminal $100_n$, the transmission apparatuses described with reference to FIGS. 2 and 3 are combined as appropriate.

Figure 4:
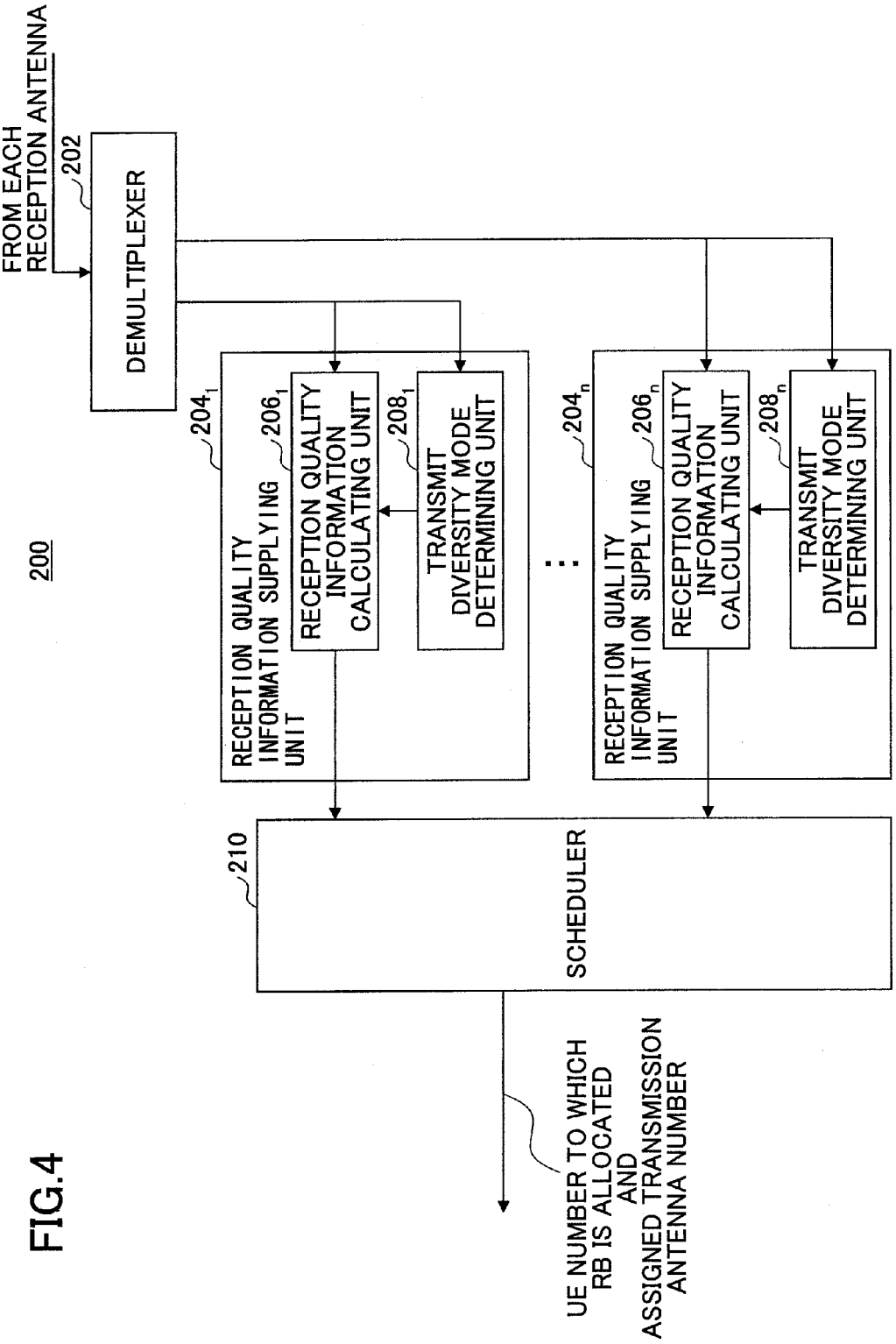
FIG. 4 shows a partial block diagram of a base station apparatus according to an embodiment of the present invention.

Next, the base station apparatus 200 according to this embodiment is described below with reference to FIG. 4.

The base station apparatus 200 according to this embodiment includes a demultiplexer 202, reception quality information supplying units $204_1$-$204_n$, and a scheduler 210. The reception quality information supplying units $204_1$-$204_n$ include reception quality information calculating units $206_1$-$206_n$ and transmit diversity mode determining units $208_1$-$208_n$. Each of the reception quality information calculating units $206_1$-$206_n$ has the same functions, and thus the term reception quality information calculating units $206_n$ may be collectively used in the following descriptions. Each of the transmit diversity mode determining units $208_1$-$208_n$ has the same functions, and thus the term transmit diversity mode determining units $208_n$ may be collectively used in the following descriptions.

The demultiplexer 202 separates sounding reference signals for each user equipment terminal $100_n$, which are transmitted from each user equipment terminal $100_n$ and received by respective reception antennas. The demultiplexer 202 supplies the sounding reference signals for each user equipment terminal $100_n$ to each of the reception quality information supplying units $204_1$-$204_n$.

The transmit diversity mode determining unit $208_n$ is connected to the demultiplexer 202. The sounding reference signals transmitted from the user equipment terminal $100_n$ are supplied to the transmit diversity mode determining unit $208_n$. The transmit diversity mode determining unit $208_n$ selects one or more antennas to be used by the user equipment terminal $100_n$ based on the supplied sounding reference signals. For example, the transmit diversity mode determining unit $208_n$ may select the same number of antennas as the number of RF circuits in the user equipment terminal $100_n$. For example, the transmit diversity mode determining unit $208_n$ separates from the sounding reference signals a sounding reference signal for each antenna in the user equipment terminal $100_n$ which has transmitted the sounding reference signals. Then, the transmit diversity mode determining unit $208_n$ determines reception quality of the sounding reference signal for each antenna in the user equipment terminal $100_n$. The transmit diversity mode determining unit $208_n$ selects one or more antennas based on the reception quality for each antenna. For example, the transmit diversity mode determining unit $208_n$ selects one or more antennas with better reception quality levels among reception quality levels for the respective antennas.

Alternatively, the transmit diversity mode determining unit $208_n$ may determine antenna correlation based on the sounding reference signals transmitted from the respective antennas in the user equipment terminal $100_n$, and then select one or more antennas based on the antenna correlation. For example, the transmit diversity mode determining unit $208_n$ may select one or more antennas with lower antenna correlation. Alternatively, the transmit diversity mode determining unit $208_n$ may select one or more antennas based on reception quality and antenna correlation of the sounding reference signals transmitted from the respective antennas in the user equipment terminal $100_n$. In this embodiment, the user equipment terminal $100_n$ includes two antennas and two RF circuits. Accordingly, these two antennas may be selected.

In addition, the transmit diversity mode determining unit $208_n$ determines a transmit diversity mode to be applied to the user equipment terminal $100_n$. For example, the transmit diversity mode determining unit $208_n$ determines the transmit diversity mode to be applied to the user equipment terminal $100_n$ based on transmit diversity modes available for the user equipment terminal $100_n$. For example, when the user equipment terminal $100_n$ supports plural transmit diversity modes, the transmit diversity mode determining unit $208_n$ selects a transmit diversity mode to be applied to the user equipment terminal $100_n$ from these plural transmit diversity modes. One or more transmit diversity modes may be selected from the plural transmit diversity modes. The transmit diversity mode determining unit $208_n$ supplies antenna selection information and transmit diversity information to the reception quality information calculating unit $206_n$.

The reception quality information calculating unit $206_n$ is connected to the demultiplexer 202 and the transmit diversity mode determining unit $208_n$. The sounding reference signals are supplied to the reception quality information calculating unit $206_n$. The reception quality information calculating unit $206_n$ determines a channel estimation value based on the sounding reference signals supplied from the demultiplexer 202. Then, using the determined channel estimation value, the reception quality information calculating unit $206_n$ calculates, as reception quality corresponding to the open-loop transmit diversity, reception quality for each resource block based on maximal ratio combining. Alternatively, using the determined channel estimation value, the reception quality information calculating unit $206_n$ may calculate, as reception quality corresponding to the closed-loop transmit diversity, reception quality for each resource block based on in-phase addition. The reception quality information calculating unit $206_n$ supplies the calculated reception quality to the scheduler 210.

For example, a channel estimation value between an antenna i in the user equipment terminal $100_n$ and an antenna j in the base station apparatus 200 is defined as $h_{ji}$. In this case, reception quality based on maximal ratio combining can be determined according to the following equation (1). The equation (1) represents reception quality in the case of the STBC mode or the SFBC mode. Alternatively, another equation may be used according to a transmit diversity mode to be applied.

$$\Sigma_i \Sigma_j |h_{ji}|^2 \quad (1)$$

When the channel estimation value between the antenna i in the user equipment terminal $100_n$ and the antenna j in the base station apparatus 200 is defined as $h_{ji}$, reception quality based on in-phase addition can be determined according to the following equation (2). The equation (2) represents reception quality in the case of the TxAA mode. Alternatively, another equation may be used according to a transmit diversity mode to be applied.

$$\Sigma_i |\Sigma_j h_{ji}|^2 \quad (2)$$

The scheduler 210 is connected to the reception quality information calculating unit $206_n$. The scheduler 210 performs scheduling based on the reception quality supplied from the reception quality information calculating unit $206_n$. For example, the scheduler 210 allocates a resource block to the user equipment terminal $100_n$ based on the reception quality supplied from the reception quality information calculating unit $206_n$. For example, the scheduler 210 may preferentially allocate resource blocks to user equipment terminals $100_n$ with better reception quality levels. When reception quality corresponding to plural transmit diversity modes is supplied from the reception quality information calculating unit $206_n$, the scheduler 210 allocates resource blocks based on better reception quality levels included in the supplied reception quality. For example, when the better reception quality levels are determined, property degradation due to control delay may be taken into consideration. For example, when a parameter indicating the property degradation is defined as $\alpha$, the scheduler 210 may determine better reception quality levels based on the product of the parameter $\alpha$ and the reception quality. Then, the scheduler 210 determines a user equipment terminal $100_n$ to which a radio resource is to be allocated and information about a transmit diversity mode (transmit diversity information) to be applied to the user equipment terminal $100_n$. The same transmit diversity mode may be applied to the user equipment terminal $100_n$ in the whole transmission band. Alternatively, a different transmit diversity mode may be applied to each transmission apparatus. Alternatively, a different transmit diversity mode may be applied for each resource block. The information about the transmit diversity mode may include information about one or more antennas to be used by the user equipment terminal $100_n$ (antenna selection information). In addition, the information about the transmit diversity mode may include transmit weight information.

The base station apparatus 200 generates control information including the antenna selection information. In addition, the base station apparatus 200 generates control information including the transmit diversity information. Alternatively, the base station apparatus 200 may generate control information including both the antenna selection information and the transmit diversity information. The base station apparatus 200 transmits the generated control information to the user equipment terminal $100_n$.

Next, an operation in the radio communication system 1000 according to this embodiment is described below with reference to FIG. 5.

Figure 6:
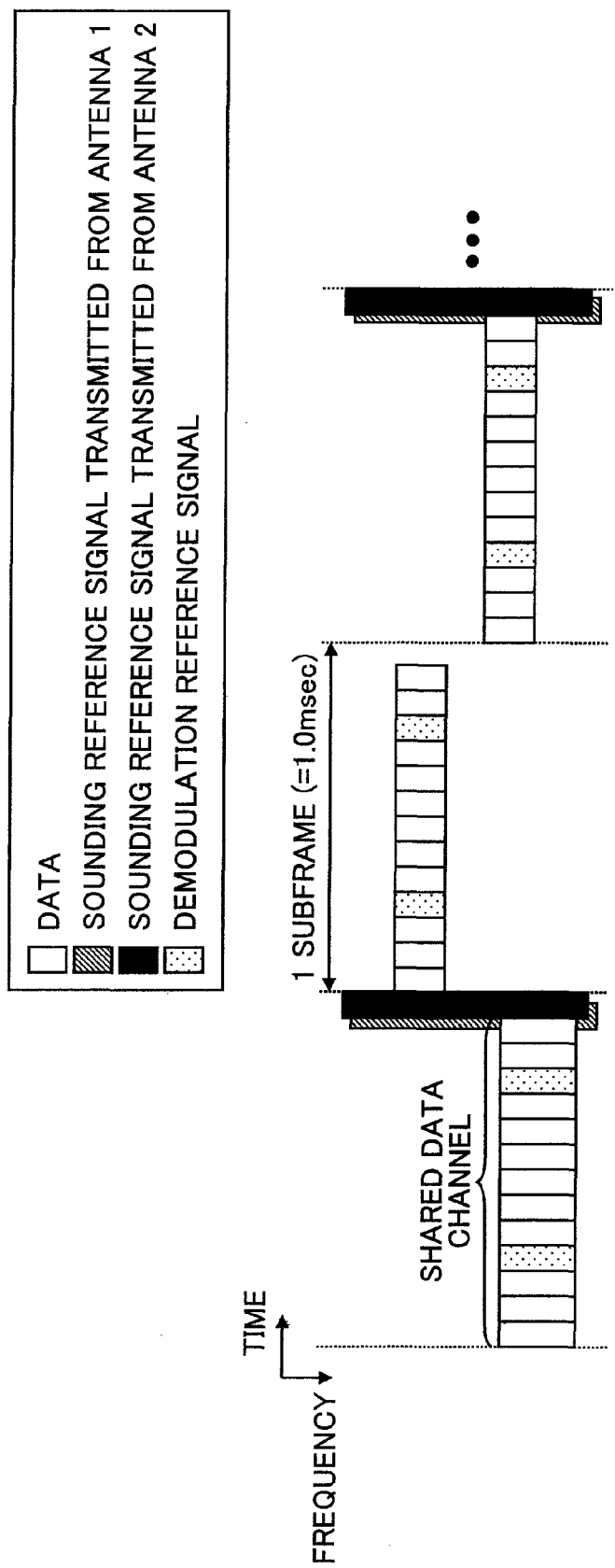
FIG. 6 shows a conceptual diagram of signals transmitted from a user equipment terminal according to an embodiment of the present invention.

The user equipment terminal $100_n$ transmits sounding reference signals (step S502). For example, the user equipment terminal $100_n$ may multiplex the sounding reference signals according to CDM (Code Division Multiplexing) among respective transmission antennas in the user equipment terminal $100_n$ to transmit them. FIG. 6 illustratively shows that sounding reference signals to be transmitted from the respective transmission antennas are multiplexed according to CDM, when the user equipment terminal $100_n$ includes two antennas. The same multiplexing scheme can be also applied to the case where the user equipment terminal $100_n$ includes three or more antennas. For example, sounding reference signals among plural user equipment terminals may be multiplexed and transmitted according to CDM. Alternatively, for example, the user equipment terminal $100_n$ may multiplex the sounding reference signals according to TDM (Time Division Multiplexing) among respective transmission antennas in the user equipment terminal $100_n$ to transmit them. For example the user equipment terminal $100_n$ alternately in terms of time transmits sounding reference signals from the respective antennas. When the user equipment terminal $100_n$ includes three or more antennas, the user equipment terminal $100_n$ may transmit sounding reference signals from the respective antennas according to the combination of CDM and TDM. For example, sounding reference signals among plural user equipment terminals may be multiplexed and transmitted according to TDM.

Figure 7:
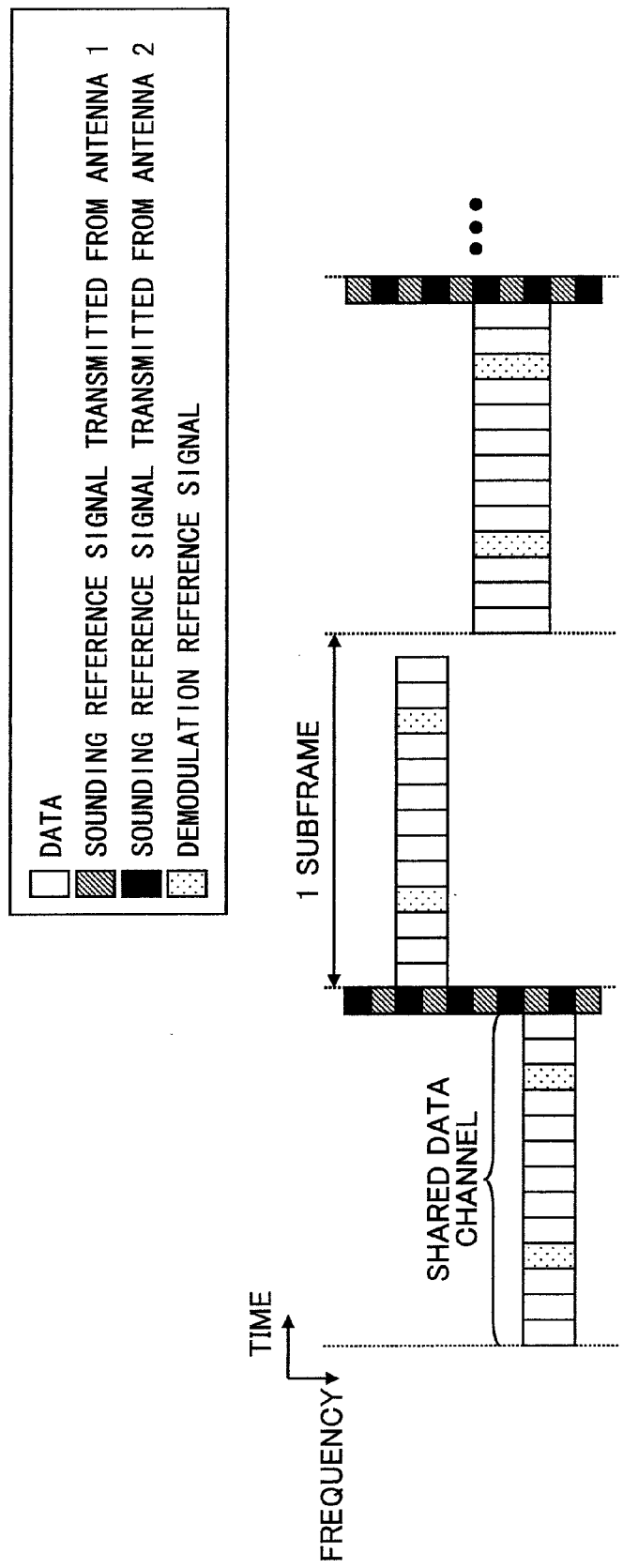
FIG. 7 shows a conceptual diagram of signals transmitted from a user equipment terminal according to an embodiment of the present invention.

Alternatively, for example, the user equipment terminal $100_n$ may multiplex the sounding reference signals according to FDM (Frequency Division Multiplexing) among respective transmission antennas in the user equipment terminal $100_n$ to transmit them, when the multi-carrier transmission scheme is used as the uplink radio access scheme. FIG. 7 illustratively shows that sounding reference signals to be transmitted from the respective transmission antennas are multiplexed according to FDM, when the user equipment terminal $100_n$ includes two antennas. For example, sounding reference signals among plural user equipment terminals may be multiplexed and transmitted according to FDM.

When the user equipment terminal $100_n$ multiplexes the sounding reference signals according to FDM among respective transmission antennas in the user equipment terminal $100_n$, allocation or arrangement of the sounding reference signals to be transmitted from the respective antennas may be changed at every transmission timing. For example, the user equipment terminal $100_n$ may replace allocation or arrangement of the sounding reference signal to be transmitted from one antenna with that of the sounding reference signal to be transmitted from another antenna at every transmission timing. When the user equipment terminal $100_n$ replaces allocation or arrangement of the sounding reference signal to be transmitted from one antenna with that of the sounding reference signal to be transmitted from another antenna at every transmission timing, channel quality can be measured in the whole frequency band assigned to the user equipment terminal $100_n$. For example, when sounding reference signals among plural user equipment terminals are multiplexed and transmitted according to FDM, allocation or assignment of the sounding reference signals may be changed at every transmission timing.

Sounding reference signals may be transmitted according to any combination of these transmission schemes.

These examples are only for illustrative purposes and may be modified as appropriate. For example, sounding reference signals may be transmitted in plural symbols included in one subframe. Further, sounding reference signals may not be mapped into all subcarriers.

The base station apparatus 200 receives the sounding reference signals transmitted from the user equipment terminal $100_n$. Based on the received sounding reference signals, the base station apparatus 200 selects one or more antennas to be used by the user equipment terminal $100_n$ for transmission of an uplink signal (step S504). For example, the transmit diversity mode determining unit $208_n$ selects one or more antennas with better reception quality levels among reception quality levels for the respective antennas. Alternatively, the transmit diversity mode determining unit $208_n$ may select one or more antennas based on antenna correlation using the sounding reference signals for the respective antennas in the user equipment terminal $100_n$. For example, the transmit diversity mode determining unit $208_n$ selects one or more antennas with lower antenna correlation. Alternatively, the transmit diversity mode determining unit $208_n$ may select one or more antennas based on reception quality and antenna correlation of the sounding reference signals for the respective antennas in the user equipment terminal $100_n$.

The base station apparatus 200 determines a transmit diversity mode to be applied to the user equipment terminal $100_n$ (step S506). The transmit diversity mode determining unit $208_n$ determines the transmit diversity mode based on transmit diversity modes available for the user equipment terminal $100_n$.

The base station apparatus 200 determines reception quality according to the determined transmit diversity mode (step S508). For example, the reception quality information calculating unit $206_n$ determines a channel estimation value based on the received sounding reference signals. Then, using the determined channel estimation value, the reception quality information calculating unit $206_n$ calculates, as reception quality corresponding to the open-loop transmit diversity, reception quality for each resource block based on maximal ratio combining. Alternatively, using the determined channel estimation value, the reception quality information calculating unit $206_n$ may calculate, as reception quality corresponding to the closed-loop transmit diversity, reception quality for each resource block based on in-phase addition. When plural transmit diversity modes are determined by the transmit diversity mode determining unit $208_n$, the reception quality information calculating unit $206_n$ calculates reception quality corresponding to the plural transmit diversity modes.

The base station apparatus 200 performs scheduling based on the calculated reception quality (step S510). For example, the scheduler 210 allocates a resource block to the user equipment terminal $100_n$ based on the reception quality supplied from the reception quality information calculating unit $206_n$. For example, the scheduler 210 may preferentially allocate resource blocks to user equipment terminals $100_n$ with better reception quality levels.

The base station apparatus 200 determines a user equipment terminal $100_n$ to which a radio resource is to be allocated and generates antenna selection information and transmit diversity information for the user equipment terminal $100_n$.

The base station apparatus 200 transmits the antenna selection information and the transmit diversity information (step S512).

The user equipment terminal $100_n$ uses the antennas specified by the antenna selection information and the transmit diversity mode specified by the transmit diversity information (step S514). For example, when the open-loop transmit diversity mode is applied, the encoding unit 104 uses the specified transmit diversity mode. For example, when the closed-loop transmit diversity mode is applied, the phase shift unit 116 controls phases based on phase control information transmitted from the base station apparatus 200.

The user equipment terminal $100_n$ transmits an uplink signal (step S516).

According to this embodiment, the reception apparatus can determine reception quality corresponding to plural transmit diversity modes based on sounding reference signals transmitted from each transmission apparatus. For example, the reception apparatus may be included in the base station apparatus 200 and the transmission apparatus may be included in the user equipment terminal $100_n$.

According to this embodiment, the transmission apparatus can change the transmit diversity mode according to the number of antennas, the number of RF circuits, and a propagation condition between the transmission apparatus and the reception apparatus. The transmit diversity mode includes an open-loop transmit diversity mode. The transmit diversity mode may include a closed-loop transmit diversity mode. Further, the transmit diversity mode may include both an open-loop transmit diversity mode and a closed-loop transmit diversity mode.

[Second Embodiment]

A radio communication system including a user equipment apparatus and a base station apparatus according to a second embodiment of the present invention is configured in the same manner as shown in FIG. 1.

Figure 8:
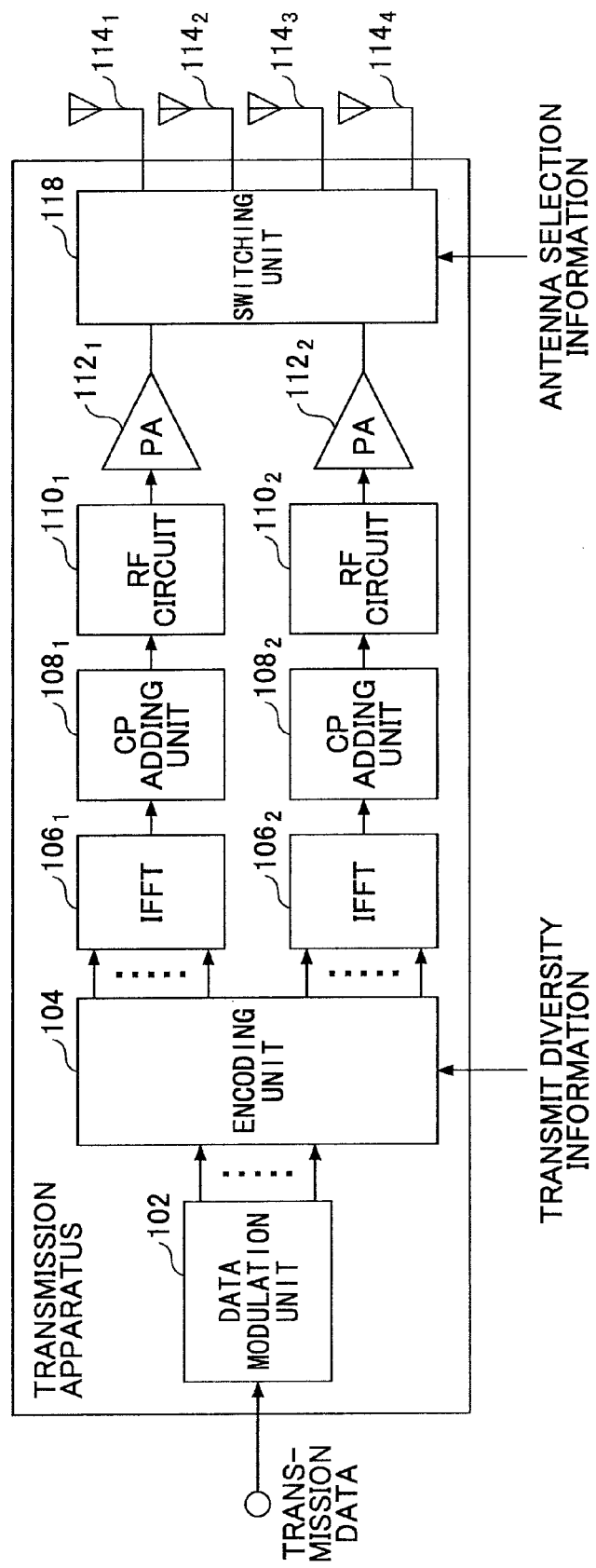
FIG. 8 shows a partial block diagram of a user equipment terminal according to an embodiment of the present invention.
Figure 9:
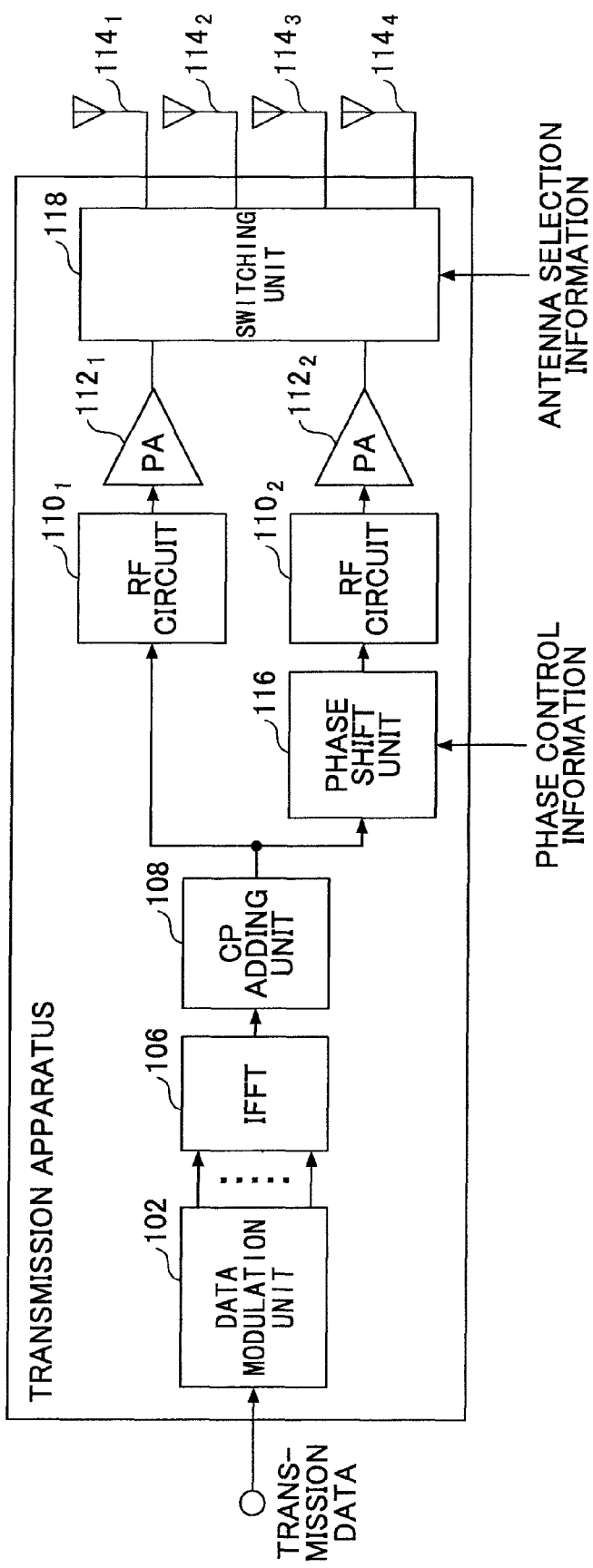
FIG. 9 shows a partial block diagram of a user equipment terminal according to an embodiment of the present invention.

In the radio communication system according to this embodiment, the user equipment terminal $100_n$ includes four antennas and two RF circuits. As shown in FIGS. 8 and 9, the user equipment terminal $100_n$ according to this embodiment includes a switching unit 118 between the power amplifiers $112_1$-$112_2$ and the antennas $114_1$-$114_4$ in addition to the components described with reference to FIGS. 2 and 3. Antenna selection information is supplied to the switching unit 118. The switching unit 118 switches antennas to transmit data based on the supplied antenna selection information.

In the base station apparatus 200 according to this embodiment, the transmit diversity mode determining unit $208_n$ selects one or more antennas to be used by the user equipment terminal $100_n$, as described above. For example, the transmit diversity mode determining unit $208_n$ may in advance exclude, from candidates of antennas to be selected, the combination of transmission antennas which is less likely to be selected. When the combination of transmission antennas which is less likely to be selected is excluded in advance from the candidates of antennas to be selected, the amount of information for transmitting the antenna selection information can be reduced. In this case, for example, $_4C_2=6$ combinations are possible, and thus three bits are needed. For example, when the user equipment terminal $100_n$ includes linearly-arranged transmission antennas, adjacent antennas may have high fading correlation. Thus, the transmit diversity mode determining unit $208_n$ may in advance exclude the combinations of these adjacent antennas. In this case, the combinations of antennas to be selected are reduced to four, and thus two bits are needed. As a result, one bit can be reduced for the amount of information to be transmitted.

Figure 5:
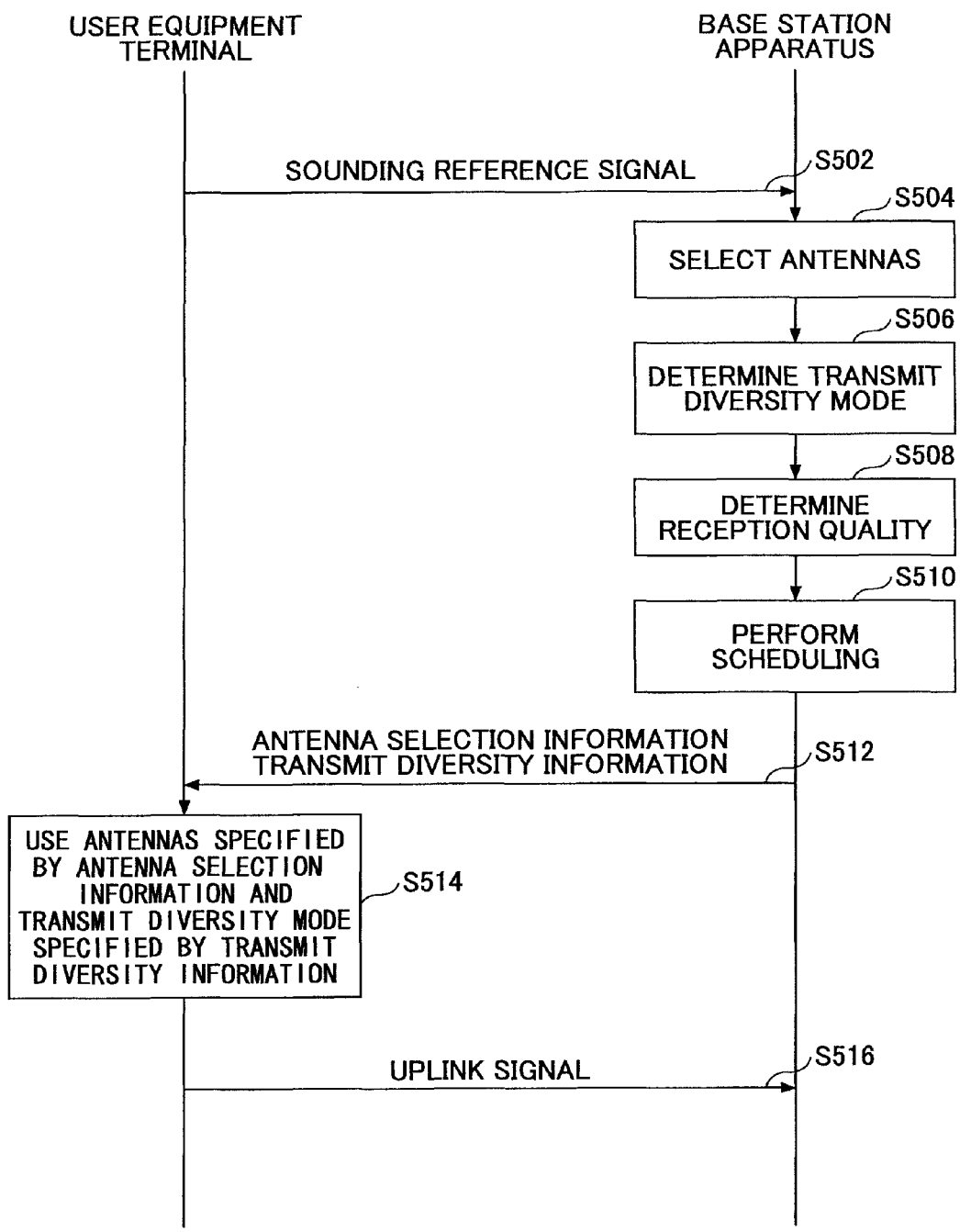
FIG. 5 shows a sequence diagram of an operation in a radio communication system according to an embodiment of the present invention.

An operation in the radio communication system according to this embodiment is performed in the same manner as shown in FIG. 5.

According to this embodiment, the reception apparatus can determine reception quality corresponding to plural transmit diversity modes based on sounding reference signals transmitted from each transmission apparatus. For example, the reception apparatus may be included in the base station apparatus 200 and the transmission apparatus may be included in the user equipment terminal $100_n$.

According to this embodiment, the transmission apparatus can change the transmit diversity mode according to the number of antennas, the number of RF circuits, and a propagation condition between the transmission apparatus and the reception apparatus. The transmit diversity mode includes an open-loop transmit diversity mode. The transmit diversity mode may include a closed-loop transmit diversity mode. Further, the transmit diversity mode may include both an open-loop transmit diversity mode and a closed-loop transmit diversity mode.

In addition, according to this embodiment, the combination of transmission antennas which is less likely to be selected can be excluded in advance from the candidates of antennas to be selected. When the combination of transmission antennas which is less likely to be selected is excluded in advance from the candidates of antennas to be selected, the amount of information for transmitting the antenna selection information can be reduced.

[Third Embodiment]

A radio communication system including a user equipment apparatus and a base station apparatus according to a third embodiment of the present invention is configured in the same manner as shown in FIG. 1.

Figure 10:
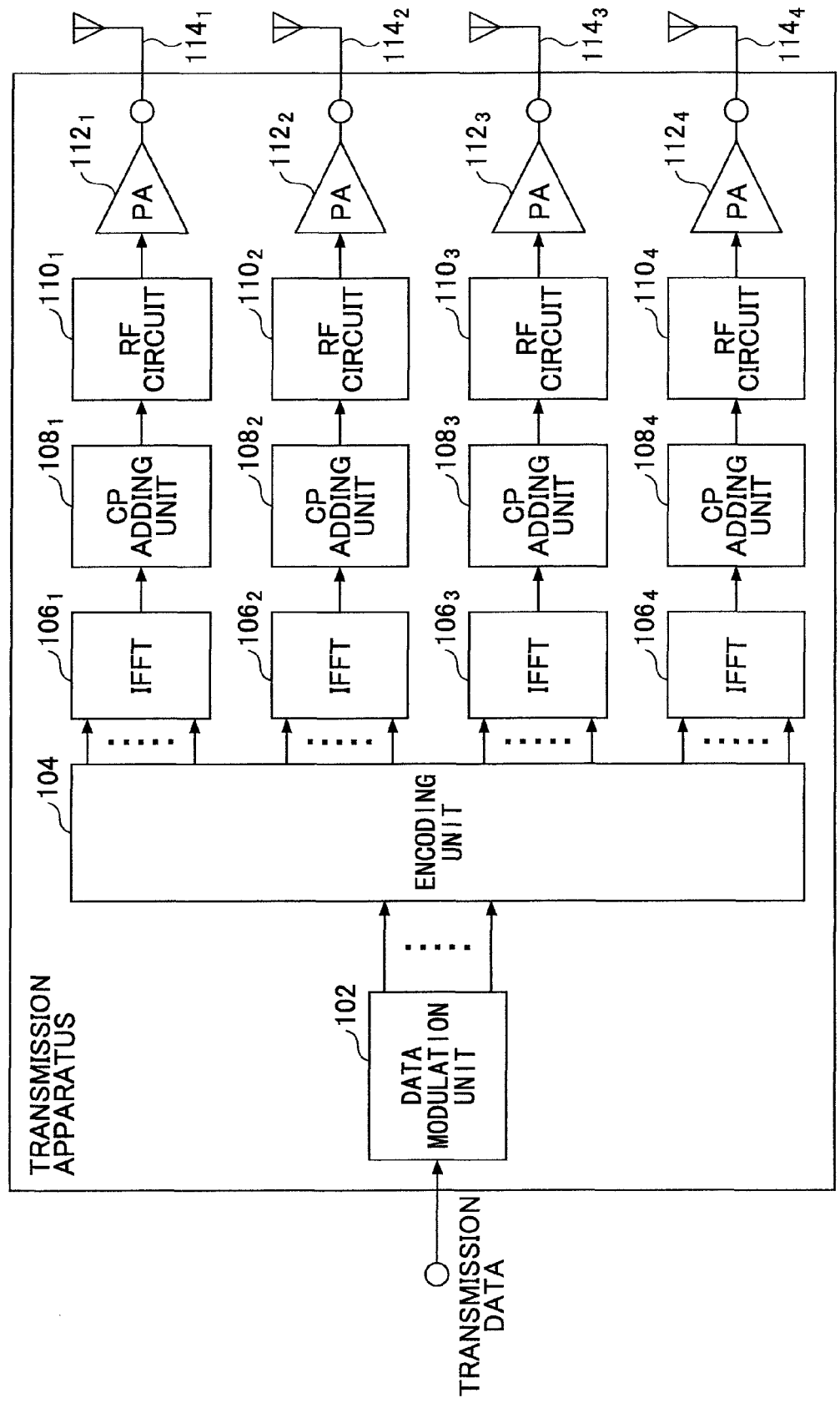
FIG. 10 shows a partial block diagram of a user equipment terminal according to an embodiment of the present invention.
Figure 11:
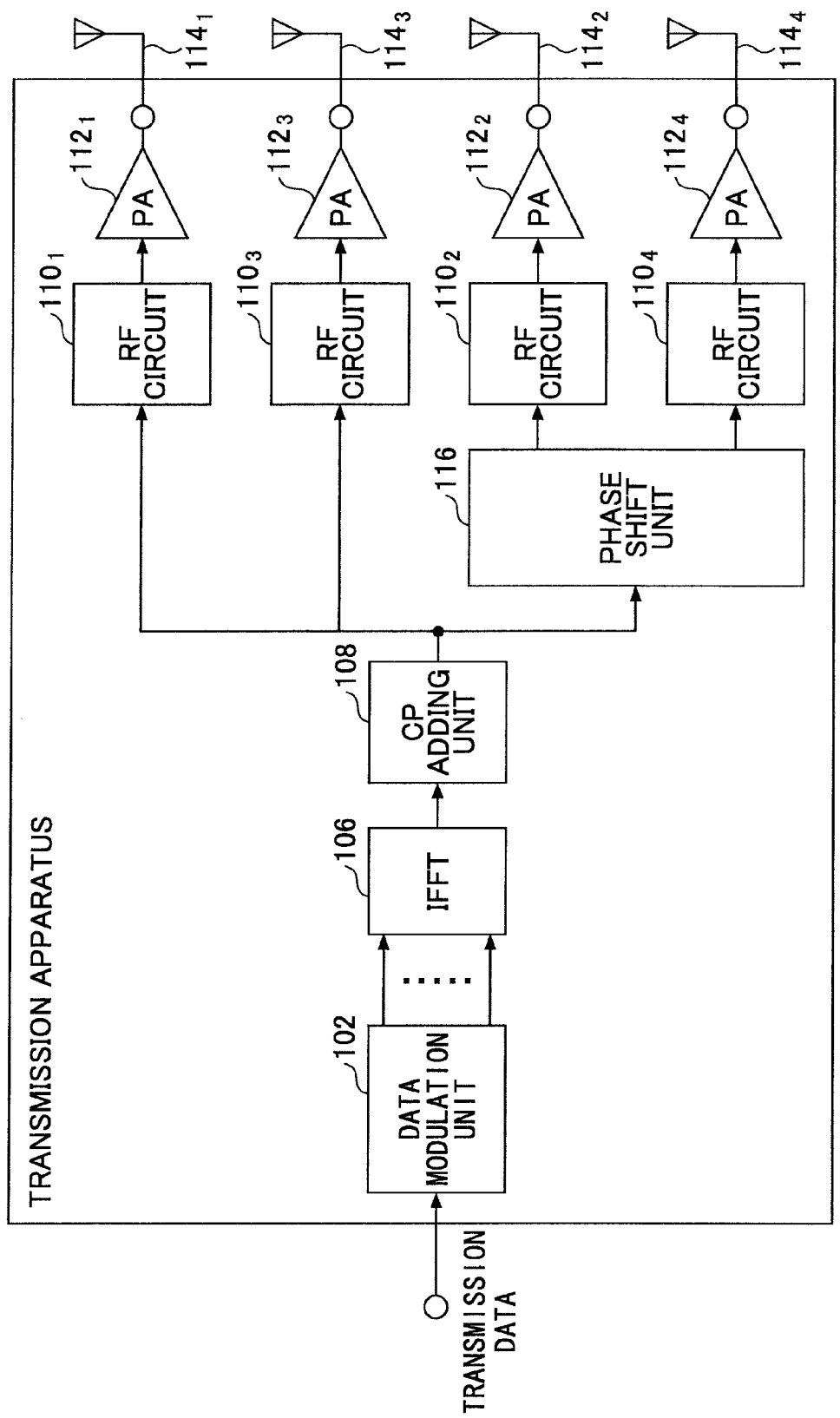
FIG. 11 shows a partial block diagram of a user equipment terminal according to an embodiment of the present invention.

In the radio communication system according to this embodiment, the user equipment terminal $100_n$ includes four antennas and four RF circuits. As shown in FIG. 10, the user equipment terminal $100_n$ according to this embodiment includes IFFT units $106_3$ and $106_4$, CP adding units $108_3$ and $108_4$, RF circuits $110_3$ and $110_4$, power amplifiers $112_3$ and $112_4$, and antennas $114_3$ and $114_4$ in addition to the components described with reference to FIG. 2. Alternatively, as shown in FIG. 11, the user equipment terminal $100_n$ according to this embodiment may include RF circuits $110_3$ and $110_4$, power amplifiers $112_3$ and $112_4$, and antennas $114_3$ and $114_4$ in addition to the components described with reference to FIG. 3.

In the base station apparatus 200 according to this embodiment, when the TxAA mode is applied, the scheduler 210 can tie two antennas in a bundle (regard two antennas as a pair of antennas) according to TxAA. In other words, with the use of two pairs of antennas, transmit diversity can be applied in the same manner as the case where two RF circuits are used. For example, as shown in FIG. 11, with the use of two pairs of antennas (a pair of antennas $114_1$ and $114_3$ and a pair of antennas $114_2$ and $114_4$), transmit diversity can be applied in the same manner as the case where two RF circuits are used.

An operation in the radio communication system according to this embodiment is performed in the same manner as shown in FIG. 5.

According to this embodiment, the reception apparatus can determine reception quality corresponding to plural transmit diversity modes based on sounding reference signals transmitted from each transmission apparatus. For example, the reception apparatus may be included in the base station apparatus 200 and the transmission apparatus may be included in the user equipment terminal $100_n$.

According to this embodiment, the transmission apparatus can change the transmit diversity mode according to the number of antennas, the number of RF circuits, and a propagation condition between the transmission apparatus and the reception apparatus. The transmit diversity mode includes an open-loop transmit diversity mode. The transmit diversity mode may include a closed-loop transmit diversity mode. Further, the transmit diversity mode may include both an open-loop transmit diversity mode and a closed-loop transmit diversity mode.

In addition, according to this embodiment, when the TxAA mode is applied, two antennas can be tied in a bundle according to TxAA.

In these embodiments, the transmit diversity mode determining unit $208_n$ may determine a transmit diversity mode to be applied based on a movement speed of the user equipment terminal $100_n$. For example, a movement speed calculated based on a maximum Doppler frequency may be supplied to the transmit diversity mode determining unit $208_n$. In this case, the transmit diversity mode determining unit $208_n$ determines a transmit diversity mode to be applied to the user equipment terminal $100_n$ based on the movement speed. For example, when the movement speed is above a predetermined threshold, the transmit diversity mode determining unit $208_n$ may determine that an open-loop transmit diversity mode is to be applied. For example, when the movement speed is below the predetermined threshold, the transmit diversity mode determining unit $208_n$ may determine that a closed-loop transmit diversity mode is to be applied.

While these embodiments are described with reference to the combination of two antennas and two RF circuits, the combination of four antennas and two RF circuits, and the combination of four antennas and four RF circuits, any other combination of antennas and RF circuits can be applied to the present invention.

Even if plural transmit diversity modes are not applied to the user equipment terminal $100_n$, sounding reference signals may be multiplexed and transmitted according to one of code division multiplexing, time division multiplexing, and frequency division multiplexing among respective transmission antennas in the same user equipment terminal $100_n$. In addition, even if plural transmit diversity modes are not applied to the user equipment terminal $100_n$, sounding reference signals may be multiplexed and transmitted according to one of code division multiplexing, time division multiplexing, and frequency division multiplexing among plural user equipment terminals. In addition, sounding reference signals may be multiplexed and transmitted according to the combination of these multiplexing and transmitting schemes.

The present invention has been described separately with reference to the specific embodiments, but separation of the embodiments are not essential to the present invention and two or more disclosed embodiments may be combined as needed. In the above-mentioned description, some specific numerical values are used for better understanding of the present invention. Unless specifically indicated, however, these numerical values are simply illustrative and any other suitable values may be used.

The present invention has been described with reference to the specific embodiments, but the embodiments are simply illustrative and variations, modifications, alterations, and substitutions could be recognized by those skilled in the art. For convenience of explanation, apparatuses or terminals according to the embodiments of the present invention have been described with reference to functional block diagrams, but these apparatuses or terminals may be implemented in hardware, software, or combinations thereof. The present invention is not limited to the above-mentioned embodiments, and variations, modifications, alterations, and substitutions can be made by those skilled in the art without deviating from the spirit of the present invention.

The present international application claims priority from Japanese Patent Application No. 2008-120661 filed on May 2, 2008, the entire contents of which are hereby incorporated herein by reference.

[Description of Notations]
50 cell
$100_1$, $100_2$, $100_3$, $100_n$ user equipment terminal
102 data modulation unit
104 encoding unit
$106_1$, $106_2$, $106_3$, $106_4$ inverse fast Fourier transform (IFFT) unit
$108_1$, $108_2$, $108_3$, $108_4$ cyclic prefix (CP) adding unit
$110_1$, $110_2$, $110_3$, $110_4$ radio frequency (RF) circuit
$112_1$, $112_2$, $112_3$, $112_4$ power amplifier (PA)
$114_1$, $114_2$, $114_3$, $114_4$ antenna
116 phase shift unit
118 switching unit
200 base station apparatus
202 demultiplexer
$204_1$-$204_n$ reception quality information supplying unit
$206_1$-$206_n$ reception quality information calculating unit
$208_1$-$208_n$ transmit diversity mode determining unit
210 scheduler
300 upper node
400 core network

The invention claimed is:

1. A base station apparatus, comprising:
a transmit diversity setting unit configured to select candidates for a transmit diversity mode to be applied to a user equipment terminal;
a reception quality calculating unit configured to determine reception quality corresponding to each of the candidates for the transmit diversity mode based on the candidates for the transmit diversity mode selected by the transmit diversity setting unit;
a scheduling unit configured to determine a user equipment terminal to which a resource block is to be allocated based on the reception quality corresponding to each of the candidates for the transmission diversity mode determined by the reception quality calculating unit;
an antenna selecting unit configured to select an antenna from which the user equipment terminal is to transmit an uplink signal based on antenna correlation of sounding reference signals transmitted from the user equipment terminal; and
a notifying unit configured to notify the user equipment terminal to which the resource block is allocated as determined by the scheduling unit of the transmit diversity mode to be applied, wherein
the reception quality calculating unit determines a channel estimation value based on the reference signals transmitted from the user equipment terminal and determines the reception quality for each resource block based on the channel estimation value, and the notifying unit notifies the user equipment terminal of information about the antenna selected by the antenna selecting unit.

2. The base station apparatus as claimed in claim 1, wherein:
the antenna selecting unit selects the antenna from which the user equipment terminal is to transmit the uplink signal based on reception quality of the sounding reference signals.

3. The base station apparatus as claimed in claim 1, wherein:
the transmit diversity setting unit sets an open-loop transmit diversity mode or a closed-loop transmit diversity mode as the transmit diversity mode to be applied to the user equipment terminal.

4. The base station apparatus as claimed in claim 3, wherein:
the transmit diversity setting unit sets at least one of a transmit diversity mode using space-time block coding, a transmit diversity mode using space-frequency block coding, a cyclic delay diversity mode, a frequency switched transmit diversity mode, a time switched transmit diversity mode, and a transmit diversity mode in which precoding vector switching is applied, upon setting the open-loop transmit diversity mode.

5. The base station apparatus as claimed in claim 3, wherein:
the transmit diversity setting unit sets a phase diversity mode, upon setting the closed-loop transmit diversity mode.

6. The base station apparatus as claimed in claim 1, wherein:
the reception quality calculating unit determines the reception quality based on maximal ratio combining or in-phase addition.

7. The base station apparatus as claimed in claim 1, wherein:
the notifying unit notifies the user equipment terminal of the transmit diversity mode to be applied as downlink control information.

8. The base station apparatus as claimed in claim 1, wherein:
the notifying unit notifies the user equipment terminal of the transmit diversity mode using upper-layer signaling.

9. The base station apparatus as claimed in claim 1, wherein:
the transmit diversity setting unit sets the transmit diversity mode to be applied to the user equipment terminal based on a movement speed of the user equipment terminal.

10. A user equipment terminal including plural antennas and plural RF circuits, to which plural transmit diversity modes are applied, comprising:
a transmission control unit configured to control transmission according to a transmit diversity mode reported from a base station apparatus among the plural transmit diversity modes;
an antenna switching unit configured to switch transmission antennas according to information about an antenna reported from the base station apparatus; and
a transmitting unit configured to transmit an uplink signal according to control by the transmission control unit using the plural RF circuits, wherein reception quality corresponding to each of candidates for the transmission diversity mode is determined based on the candidates for the transmission diversity mode selected by the base station apparatus;

a user equipment terminal to which a resource block is to be allocated is determined based on the reception quality corresponding to each of the candidates for the transmission diversity mode;

an antenna from which the user equipment terminal is to transmit an uplink signal is selected based on antenna correlation of sounding reference signals transmitted from the user equipment terminal, and the transmission diversity mode to be applied is reported to the user equipment terminal to which the resource block is to be allocated.

11. The user equipment terminal as claimed in claim 10, wherein:

the transmitting unit transmits sounding reference signals from the plural antennas.

12. The user equipment terminal as claimed in claim 11, wherein:

the transmitting unit transmits the sounding reference signals according to at least one of code division multiplexing, time division multiplexing, and frequency division multiplexing among respective transmission antennas.

13. The user equipment terminal as claimed in claim 11, wherein:

the transmitting unit transmits the sounding reference signals according to at least one of code division multiplexing, time division multiplexing, and frequency division multiplexing between the user equipment terminal and other user equipment terminals.

14. A communication control method, comprising the steps of:

selecting, by a base station apparatus, candidates for a transmit diversity mode to be applied to a user equipment terminal;

determining, by the base station apparatus, reception quality corresponding to each of the candidates for the transmit diversity mode based on the candidates for the transmit diversity mode selected in the selecting step;

determining, by the base station apparatus, a user equipment terminal to which a resource block is to be allocated based on the reception quality corresponding to each of the candidates for the transmission diversity mode determined in the reception quality determining step;

selecting, by the base station apparatus, an antenna from which the user equipment terminal is to transmit an uplink signal based on antenna correlation of sounding reference signals transmitted from the user equipment terminal; and notifying, by the base station apparatus, the user equipment terminal to which the resource block is allocated as determined in the user equipment terminal determining step of the transmit diversity mode to be applied, wherein the step of determining the reception quality comprises determining a channel estimation value based on the reference signals transmitted from the user equipment terminal and determining the reception quality for each resource block based on the channel estimation value, and the notifying step comprises notifying the user equipment terminal of information about the antenna selected in the step of selecting the antenna.

* * * * *